US011840207B2

(12) United States Patent
Seol (10) Patent No.: US 11,840,207 B2
(45) Date of Patent: Dec. 12, 2023

(54) METHOD FOR CONTROLLING ESC INTEGRATED BRAKING SYSTEM

(71) Applicant: HYUNDAI MOBIS Co., Ltd., Seoul (KR)

(72) Inventor: Yong Cheol Seol, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 769 days.

(21) Appl. No.: 16/995,814

(22) Filed: Aug. 18, 2020

(65) Prior Publication Data

US 2021/0053543 A1     Feb. 25, 2021

(30) Foreign Application Priority Data

Aug. 20, 2019   (KR) .................. 10-2019-0101579

(51) Int. Cl.
*B60T 17/22*    (2006.01)
*B60T 8/88*     (2006.01)
(Continued)

(52) U.S. Cl.
CPC .............. *B60T 17/22* (2013.01); *B60T 8/885* (2013.01); *B60T 8/92* (2013.01); *B60T 13/142* (2013.01); *B60T 13/686* (2013.01); *B60T 2220/04* (2013.01); *B60T 2270/402* (2013.01); *B60T 2270/88* (2013.01)

(58) Field of Classification Search
CPC . B60T 17/22; B60T 8/885; B60T 8/92; B60T 13/142; B60T 13/686; B60T 2220/04; B60T 2270/402; B60T 2270/88; B60T 7/042; B60T 13/146; B60T 13/662; B60T 13/745; B60T 8/88; B60T 7/06;
(Continued)

(56) References Cited

U.S. PATENT DOCUMENTS 6,464,307 B1   10/2002   Yoshino
9,346,443 B2    5/2016   Koo
(Continued)

FOREIGN PATENT DOCUMENTS

CN         104648368       5/2015
KR      10-1997-0000784    1/1997

OTHER PUBLICATIONS

Chinese Office Action dated Aug. 22, 2022, in Chinese Patent Application No. 202010841686.2.

*Primary Examiner* — Behrang Badii
(74) *Attorney, Agent, or Firm* — H.C. Park & Associates, PLC (57) ABSTRACT

Disclosed is a method of controlling an electronic stability control (ESC) integrated braking system, which includes, when a failure in which pressure is unable to be formed in a master cylinder unit is detected during braking of a vehicle by the ESC integrated braking system, maintaining, by a controller, a braking force applied during the braking by closing designated oil pressure relief valves for coupling the master cylinder unit and a flow channel of a circuit, and when pressure (PC1) of a pedal cylinder becomes equal to or greater than pressure (MC1) of the circuit based on the maintained braking force, by a brake pedal stepped on by a driver, controlling, by the controller, the designated oil pressure relief valves to be in an open state and then switching the state of the designated oil pressure relief valves to a mechanical backup state.

20 Claims, 4 Drawing Sheets

(51) Int. Cl.
*B60T 8/92* (2006.01)
*B60T 13/14* (2006.01)
*B60T 13/68* (2006.01)

(58) Field of Classification Search
CPC .... B60T 8/1755; B60T 8/4291; B60T 8/4081; B60T 13/741; B60Y 2306/15; B60Y 2400/81
See application file for complete search history.

(56) References Cited

U.S. PATENT DOCUMENTS

| | | | |
|---|---|---|---|
| 10,407,039 B2* | 9/2019 | Kishi | B60T 7/042 |
| 2013/0220463 A1* | 8/2013 | Kim | B60T 8/4872 |
| | | | 138/30 |
| 2013/0240303 A1* | 9/2013 | Kim | B60T 1/065 |
| | | | 188/72.3 |
| 2013/0270894 A1* | 10/2013 | Kim | B60T 8/4872 |
| | | | 303/6.01 |
| 2013/0277156 A1* | 10/2013 | Yang | B60T 8/368 |
| | | | 188/72.3 |
| 2015/0145322 A1* | 5/2015 | Jeon | B60T 13/146 |
| | | | 303/10 |
| 2017/0217415 A1* | 8/2017 | Kim | B60T 13/146 |

\* cited by examiner

METHOD FOR CONTROLLING ESC INTEGRATED BRAKING SYSTEM

CROSS-REFERENCE TO RELATED APPLICATION

This application claims priority from and the benefit of Korean Patent Application No. 10-2019-0101579, filed on Aug. 20, 2019, which is hereby incorporated by reference for all purposes as if set forth herein.

BACKGROUND

Field

Exemplary embodiments of the present disclosure relate to a method of controlling an electronic stability control (ESC) integrated braking system, and more particularly, to a method of controlling an ESC integrated braking system, wherein when a failure in which pressure cannot be formed by an actuator occurs in a master cylinder unit, the state of the ESC integrated braking system switches to a mechanical backup state in which a braking force is generated by only the pedal force of a driver, thus preventing a kickback phenomenon occurring because a liquid measure formed in the master cylinder unit flows into a pedal simulator and thus sudden pressure is formed in the pedal simulator.

Discussion Of The Background

In general, a brake system includes an anti-lock brake system (ABS) for preventing the skid of a wheel upon braking, a brake traction control system (BTCS) for preventing the slip of a driving wheel upon sudden unintended acceleration or sudden acceleration of a vehicle, and an electronic stability control (ESC) system for stably maintaining the driving state of a vehicle by combining the ABS and traction control and controlling brake oil pressure.

However, in the brake system for controlling pressure of a master cylinder unit using an actuator (e.g., motor) like the ESC integrated braking system, a failure may occur in which pressure cannot be controlled in the master cylinder unit for generating braking pressure. For example, when a failure in which braking pressure cannot be controlled occurs in the master cylinder unit due to a failure of a position sensor (hall & encoder) necessary for motor control, a failure of a motor current sensor or damage to a motor, the state of the brake system switches to a mechanical backup state in which a braking force can be generated by only the pedal force of a driver through a pedal simulator.

If the ESC integrated braking system is controlled normally, however, the pedal force (or pedal feel) of a driver is formed by the rubber and spring of the pedal simulator. In this case, pressure formed in the pedal simulator is much smaller than pressure formed in the master cylinder unit.

While the ESC integrated braking system performs braking in a normal state, if the state of the ESC integrated braking system switches to the mechanical backup state because a failure in which braking pressure cannot be formed by the actuator (e.g., motor) occurs in the master cylinder unit, a liquid measure formed in the master cylinder unit flows into the pedal simulator having smaller pressure than the master cylinder unit, a braking force formed in the normal state is reduced, and sudden pressure is formed in the pedal simulator. Accordingly, there is a problem in that a great impact attributable to kickback is applied to a driver.

Accordingly, there is a need for a method capable of preventing the occurrence of kickback when the state of the ESC integrated braking system switches to the mechanical backup state while performing braking in the normal state.

The Background Technology of the present disclosure is disclosed in Korean Patent Application Laid-Open No. 10-1997-0000784 (published on Jan. 21, 1997 and entitled "Power Control Device for Automobiles").

SUMMARY

Various embodiments are directed to the provision of a method of controlling an ESC integrated braking system, wherein when a failure in which pressure cannot be formed by an actuator occurs in a master cylinder unit, the state of the ESC integrated braking system switches to a mechanical backup state in which a braking force is generated by only the pedal force of a driver, thus preventing a kickback phenomenon that occurs because a liquid measure formed in the master cylinder unit flows into a pedal simulator and thus sudden pressure is formed in the pedal simulator.

In an embodiment, a method of controlling an electronic stability control (ESC) integrated braking system includes, when a failure in which pressure is unable to be formed in a master cylinder unit is detected during braking of a vehicle by the ESC integrated braking system, maintaining, by a controller, a braking force applied during the braking by closing designated oil pressure relief valves for coupling the master cylinder unit and a flow channel of a circuit, and when pressure (PC1) of a pedal cylinder becomes equal to or greater than pressure (MC1) of the circuit based on the maintained braking force, by a brake pedal stepped on by a driver, controlling, by the controller, the designated oil pressure relief valves to be in an open state and then switching the state of the designated oil pressure relief valves to a mechanical backup state.

In an embodiment, the circuit means a flow channel including inlet valves and outlet valves for forming braking pressure in respective wheel cylinders of front wheels and rear wheels via the designated oil pressure relief valves.

In an embodiment, the method further includes immediately switching, by the controller, the state of the designated oil pressure relief valves to the mechanical backup state when the failure in which pressure is unable to be formed in the master cylinder unit is detected prior to the braking of the vehicle by the ESC integrated braking system.

In an embodiment, the method further includes, when a failure in which pressure is unable to be formed in the master cylinder unit is not detected prior to the braking of the vehicle by the ESC integrated braking system, checking, by the controller, whether a required braking force is generated through a pedal stroke sensor, and determining, by the controller, that the required braking force has not been generated if a pedal stroke is 0 as a result of the check and performing initial location control for maintaining the master cylinder unit in an initial state.

In an embodiment, the method further includes, if the pedal stroke is not 0 as a result of the check, calculating, by the controller, required pressure corresponding to the pedal stroke value, and performing, by the controller, pressure control over the master cylinder unit in accordance with the calculated required pressure by driving an actuator of the master cylinder unit.

In an embodiment, the method further includes, if pressure of the master cylinder unit corresponding to the pressure control is unable to be formed after the performing of the pressure control over the master cylinder unit in accordance with the calculated required pressure, checking, by the controller, whether the designated oil pressure relief valves are in a normal state, and immediately switching, by the controller, the state of the designated oil pressure relief valves to the mechanical backup state if the designated oil pressure relief valves are not in the normal state as a result of the check of the states of the designated oil pressure relief valves.

In an embodiment, the designated oil pressure relief valves includes a fourth oil pressure relief valve for coupling the master cylinder unit and a flow channel of a front wheel-side circuit, and a fifth oil pressure relief valve for coupling the master cylinder unit and a flow channel of a rear wheel-side circuit.

In an embodiment, the method further includes, if the designated oil pressure relief valves are in the normal state, performing, by the controller, duty control over the designated oil pressure relief valves in a closed state, and controlling, by the controller, a sixth oil pressure relief valve to be in the closed state, the sixth oil pressure relief valve being a split block valve formed in a flow channel for coupling the designated oil pressure relief valves.

In an embodiment, the method further includes, in the maintaining of the braking force applied during the braking by closing the designated oil pressure relief valves for coupling the master cylinder unit and the flow channel of the circuit, in the state in which a pedal stroke continues to be input, controlling to continue to maintain by the controller, the designated oil pressure relief valves in the closed state when the pressure of the pedal cylinder unit is smaller than the pressure of the circuit.

In an embodiment, the method further includes, after the maintaining of the braking force applied during the braking by closing the designated oil pressure relief valves for coupling the master cylinder unit and the flow channel of the circuit, when the brake pedal is released, performing, by the controller, duty control over the designated oil pressure relief valves in the open state in accordance with a released degree of the brake pedal.

In an embodiment, in the maintaining of the braking force applied during the braking by closing the designated oil pressure relief valves for coupling the master cylinder unit and the flow channel of the circuit, the controller releases the maintaining of the braking force when a required braking force does not occur because the driver does not step on the brake pedal or the pressure of the pedal cylinder unit is equal to or greater than the pressure of the circuit.

In an embodiment, when the maintaining of the braking force is released, the controller switches to the state of the designated oil pressure relief valves to the mechanical backup state and turns on a warning lamp.

DESCRIPTION OF THE ILLUSTRATED EMBODIMENTS

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, a method of controlling an ESC integrated braking system according to the present disclosure will be described below with reference to the accompanying drawings through various exemplary embodiments.

The thickness of lines or the size of elements shown in the drawings in a process of describing this specification may have been exaggerated for the clarity of a description and for convenience' sake. Terms to be described below have been defined by taking into consideration their functions in the present disclosure, and may be changed depending on a user or operator's intention or practice. Accordingly, such terms should be interpreted based on the overall contents of this specification.

Figure 1:
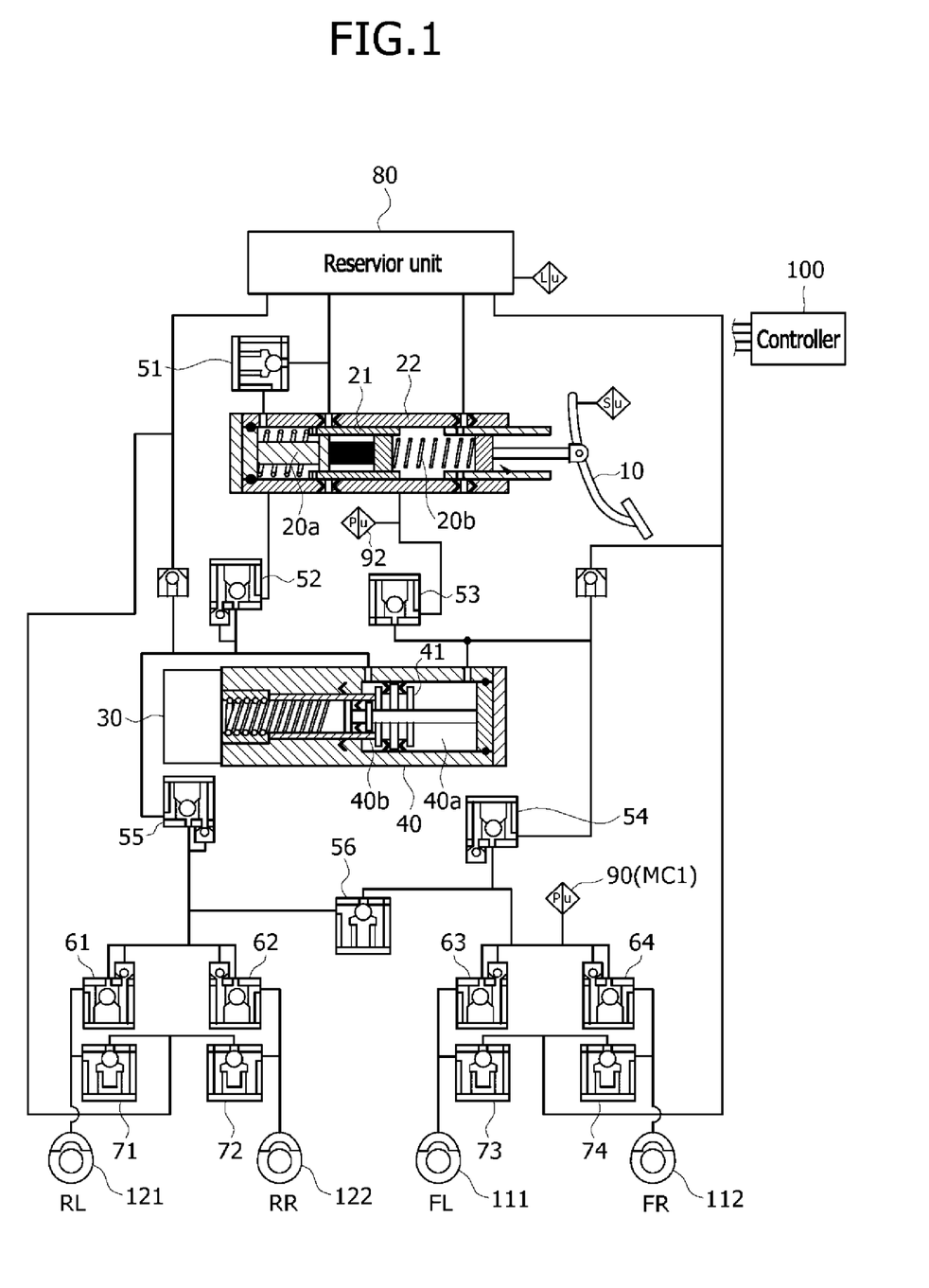
FIG. 1 is an exemplary diagram schematically illustrating a configuration of an ESC integrated braking system according to an embodiment.

FIG. 1 is an exemplary diagram schematically illustrating a configuration of an ESC integrated braking system according to an embodiment.

As illustrated in FIG. 1, an apparatus for controlling an ESC integrated braking system according to the present embodiment includes a reservoir unit 80, a pedal cylinder unit 20, a motor 30, a master cylinder unit 40, wheel cylinders 111, 112, 121, and 122, oil pressure relief valves 51, 52, 53, 54, 55, and 56, and a controller 100.

The reservoir unit 80 is coupled to the top of the pedal cylinder unit 20, and stores oil.

In this case, the reservoir unit 80 may include a reservoir liquid measure sensor Lu.

The pedal cylinder unit 20 forms oil pressure by the pressurization of a brake pedal 10.

The pedal cylinder unit 20 may include a pedal cylinder 22 and a pedal simulator 21, and form two chambers 20a and 20b. For example, the pedal cylinder unit 20 may include a first chamber 20a and a second chamber 20b.

For example, when the pedal force of a driver is applied to the brake pedal 10, oil pressure is formed by the pedal cylinder 22. The formed oil pressure is supplied to a piston of the pedal simulator 21, and pressurizes the elastic body of the pedal simulator 21. Accordingly, a pedal feel of the driver is implemented by the reaction force of the pressurized elastic body.

The motor 30 is driven by an electrical signal output in accordance with the displacement of the brake pedal 10.

The controller 100 may receive a rotation detection signal of the brake pedal 10 and control the driving of the motor 30.

The master cylinder unit 40 is driven by the motor 30 controlled by the controller 100, and generates oil pressure and supplies the generated oil pressure to the wheel cylinders 111, 112, 121, and 122 for performing the braking of wheels FL, FR, RL and RR, respectively.

In this case, the controller 100 may be an electronic control unit (ECU), that is, a representative control unit of a vehicle.

For example, when a driver steps on the brake pedal 10, a pedal stroke sensor S/u detects a stroke of the brake pedal 10 and transmits the detected stroke to the controller 100. The controller 100 controls oil pressure, formed in the master cylinder unit 40, by controlling the motor 30 based on the stroke distance (or displacement) of the brake pedal 10 detected by the pedal stroke sensor S/u.

At this time, the motor 30 operates under the control of the controller 100 in order to form braking oil pressure based on signals output by the pedal stroke sensor S/u and a pedal cylinder pressure sensor 92 as the brake pedal 10 is pressurized.

The master cylinder unit 40 may include a master piston 41, and may form two chambers 40a and 40b. For example, the master cylinder unit 40 may include a third chamber 40a and a fourth chamber 40b.

The wheel cylinders 111, 112, 121, and 122 include a first wheel cylinder 111 for braking the front left wheel FL of a vehicle, a second wheel cylinder 112 for braking the front right wheel FR of the vehicle, a third wheel cylinder 121 for braking the rear left wheel RL of the vehicle, and a fourth wheel cylinder 122 for braking the rear right wheel RR of the vehicle.

The apparatus includes inlet valves 61 to 64 for regulating brake oil supplied to the first to fourth wheel cylinders 111, 112, 121, and 122, respectively. Outlet valves 71, 72, 73, and 74 for regulating brake oil discharged by the first to fourth wheel cylinders 111, 112, 121, and 122, respectively, are provided in an oil pressure channel between the first to fourth wheel cylinders 111, 112, 121, and 122 and the reservoir unit 80.

The oil pressure relief valves 51, 52, 53, 54, 55, and 56 are provided in oil pressure channels and are opened or closed under the control of the controller 100. The oil pressure relief valves 51, 52, 53, 54, 55, and 56 may include first to sixth oil pressure relief valves.

The first oil pressure relief valve 51 is provided in an oil pressure channel that couples the reservoir unit 80 and the first chamber 20a of the pedal cylinder unit 20, and adjusts oil pressure by being opened or closed under the control of the controller 100.

The second oil pressure relief valve 52 is provided in an oil pressure channel that couples the first chamber 20a of the pedal cylinder unit 20 and the fourth chamber 40b of the master cylinder unit 40, and adjusts oil pressure by being opened or closed under the control of the controller 100.

The third oil pressure relief valve 53 is provided in an oil pressure channel that couples the second chamber 20b of the pedal cylinder unit 20 and the third chamber 40a of the master cylinder unit 40, and adjusts oil pressure by being opened or closed under the control of the controller 100.

The fourth oil pressure relief valve 54 is provided in an oil pressure channel that couples the third chamber 40a of the master cylinder unit 40 and the first and second wheel cylinders 111 and 112, and adjusts oil pressure by being opened or closed under the control of the controller 100.

The fifth oil pressure relief valve 55 is provided in an oil pressure channel that couples the fourth chamber 40b of the master cylinder unit 40 and the third and fourth wheel cylinders 121 and 122, and adjusts oil pressure by being opened or closed under the control of the controller 100.

The sixth oil pressure relief valve 56 (or split block valve) is provided in an oil pressure channel that couples the fourth oil pressure relief valve 54 and the third and fourth wheel cylinders 121 and 122 and an oil pressure channel that couples the fifth oil pressure relief valve 55 and the first and second wheel cylinders 111 and 112, and adjusts oil pressure by being opened or closed under the control of the controller 100.

In this case, the oil pressure channel that couples the fourth oil pressure relief valve 54 and the third and fourth wheel cylinders 121 and 122 is coupled to the fourth chamber 40b of the master cylinder unit 40, and guides oil pressure to the third and fourth wheel cylinders 121 and 122 mounted on the two rear wheels RL and RR, respectively. Furthermore, the oil pressure channel that couples the fourth oil pressure relief valve 54 and the third and fourth wheel cylinders 121 and 122 may include a second pressure sensor 95 for measuring oil pressure. In this case, the second pressure sensor 95 may be deleted for a cost reduction.

Furthermore, the oil pressure channel that couples the fifth oil pressure relief valve 55 and the first and second wheel cylinders 111 and 112 is coupled to the third chamber 40a of the master cylinder unit 40, and guides oil pressure to the first and the second wheel cylinders 111 and 112 mounted on the two front wheels FL and FR, respectively. Furthermore, the oil pressure channel that couples the fifth oil pressure relief valve 55 and the first and second wheel cylinders 111 and 112 may include a first pressure sensor 90 for measuring oil pressure.

The first to sixth oil pressure relief valves 51, 52, 53, 54, 55, and 56 may be valves that always operate, and may be configured as solenoid valves controlled by the controller 100.

Furthermore, the sixth oil pressure relief valve 56 (or split block valve) is a line split valve, and may set a spring force capable of maintaining pressure having a given value or more in an off state.

The structure of the ESC integrated braking system configured as described above is generally described below. When the pedal force of a driver is applied to the brake pedal 10, oil pressure is formed by the pedal cylinder unit 20. In this case, the formed oil pressure is supplied to the piston of the pedal simulator 21 and pressurizes the elastic body of the pedal simulator 21. A pedal feel of the driver is implemented by the reaction force of the pressurized elastic body. The motor 30 is driven under the control of the controller 100 in order to form braking oil pressure based on signals output by the pedal stroke sensor S/u and the pedal cylinder pressure sensor 92 as the brake pedal 10 is pressurized. The master cylinder unit 40 forms braking oil pressure through the master piston 41 forward and backward moved by the motor 30.

A method of preventing the occurrence of a kickback phenomenon through control of the oil pressure relief valves (may be hereinafter simply described as valves) before the ESC integrated braking system switches to the mechanical backup state when a failure in which braking pressure cannot be controlled occurs in the master cylinder unit while the ESC integrated braking system performs braking in the normal state is described below with reference to FIGS. 2 to 4.

Figure 2:
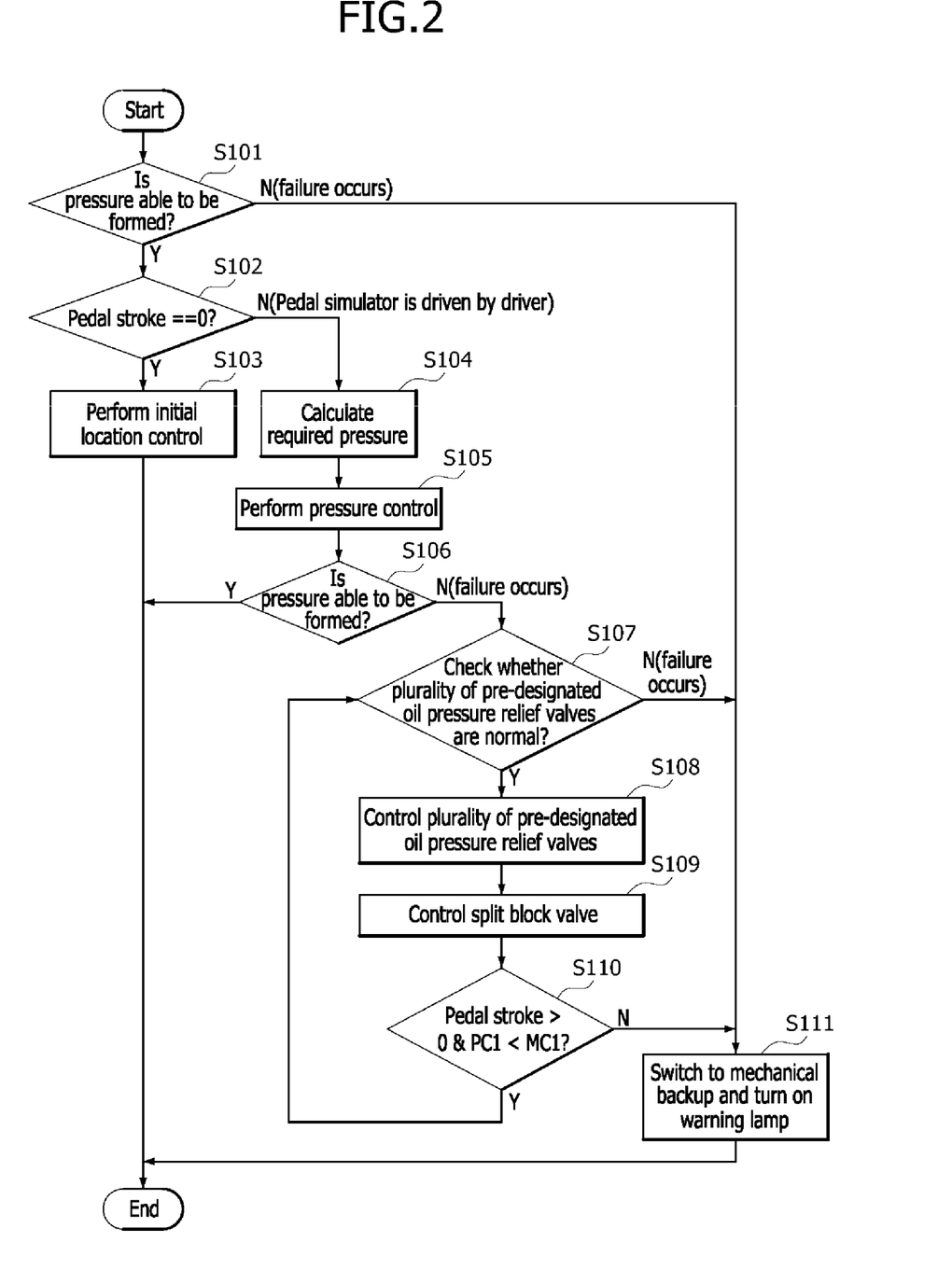
FIG. 2 is a flowchart for describing a method of controlling the ESC integrated braking system according to an embodiment.

FIG. 2 is a flowchart for describing a method of controlling the ESC integrated braking system according to an embodiment. FIG. 3 is an exemplary diagram illustrating operation valves upon forward direction pressure control in the normal state in FIG. 2. FIG. 4 is an exemplary diagram illustrating operation valves prior to a switching to the mechanical backup state in FIG. 2.

Referring to FIG. 2, the controller 100 checks whether braking pressure may be formed in the master cylinder unit 40 (S101).

For example, the controller 100 is configured to check the state of the master cylinder unit 40 and the state of the actuator (i.e., motor) 30 thereof in real time using a plurality of sensors (e.g., position sensor, pressure sensor, and current sensor). In the present embodiment, a description of a configuration for checking the state of the master cylinder unit 40, which departs from the technical subject matter of the present disclosure, is omitted.

If, as a result of the check in S101, braking pressure cannot be formed in the master cylinder unit 40 (No in S101) (i.e., if a failure has already occurred in a standby state before braking is started), the controller 100 immediately switches to the mechanical backup state and turns on a warning lamp (S111).

If, as a result of the check in S101, braking pressure may be formed in the standby state before braking is started (Yes in S101), the controller 100 checks whether a required braking force is generated by the pedal stroke sensor S/u (i.e., checks whether the pedal simulator operates as a driver steps on the brake pedal) (S102).

If, as a result of the check in S102, a pedal stroke is 0 (Yes in S102), it indicates that the required braking force has not been generated (i.e., the state in which the pedal simulator does not operate because the driver does not step on the brake pedal). Thus, the controller 100 performs initial location control (S103) (i.e., maintains the master cylinder unit in an initial state).

If, as a result of the check in S102, the pedal stroke is not 0 (No in S102), it indicates that the required braking force has been generated (i.e., the state in which the pedal simulator operates because the driver steps on the brake pedal). Thus, the controller 100 calculates required pressure corresponding to the pedal stroke value (S104), and performs pressure control corresponding to the calculated required pressure by driving the actuator (i.e., motor) 30 of the master cylinder unit 40 (S105).

At this time, if the master cylinder unit 40 and the actuator (i.e., motor) 30 are in the normal state, pressure (i.e., braking pressure) according to the pressure control may be formed (Yes in S106).

Figure 3:
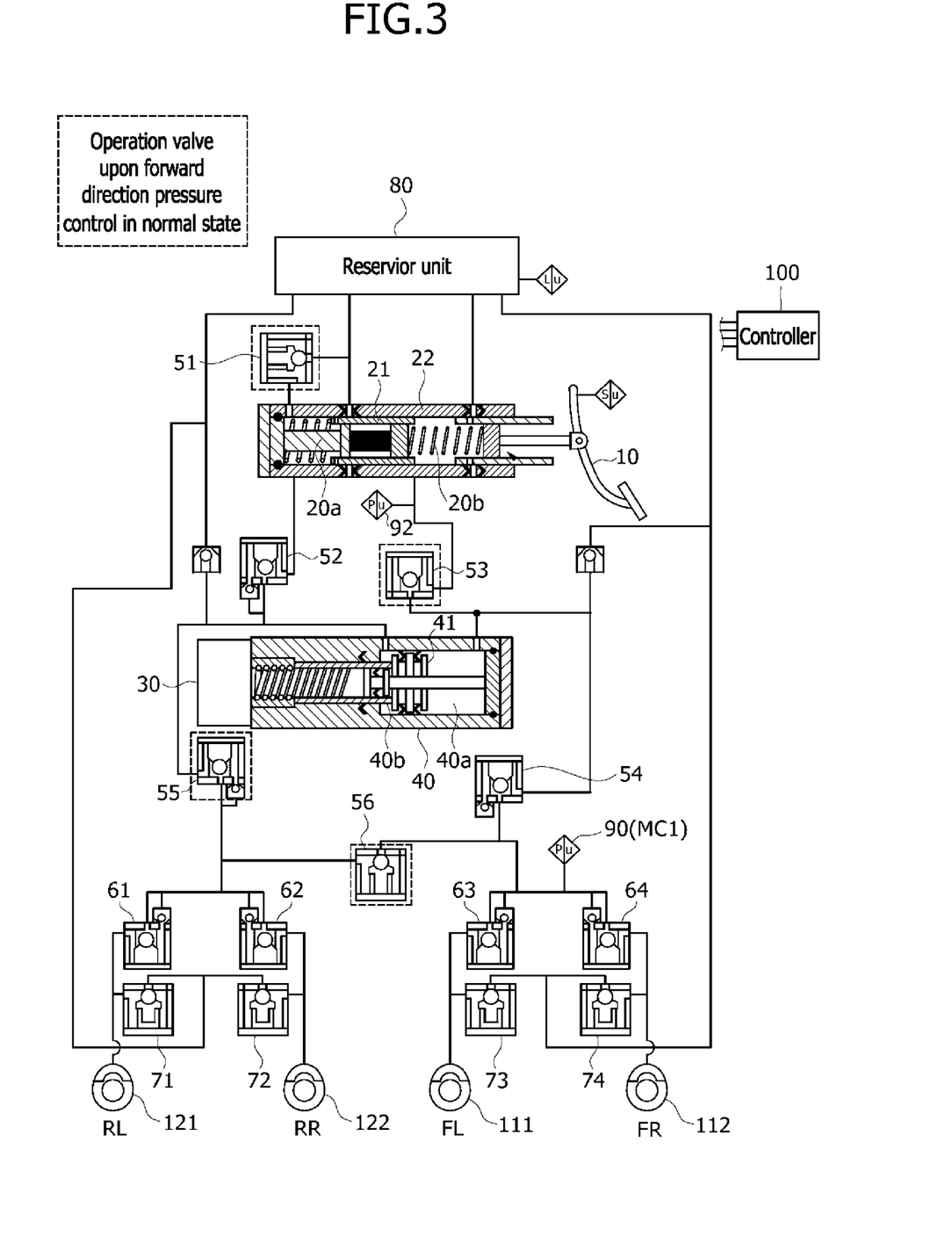
FIG. 3 is an exemplary diagram illustrating operation valves upon forward direction pressure control in a normal state in FIG. 2.
Figure 4:
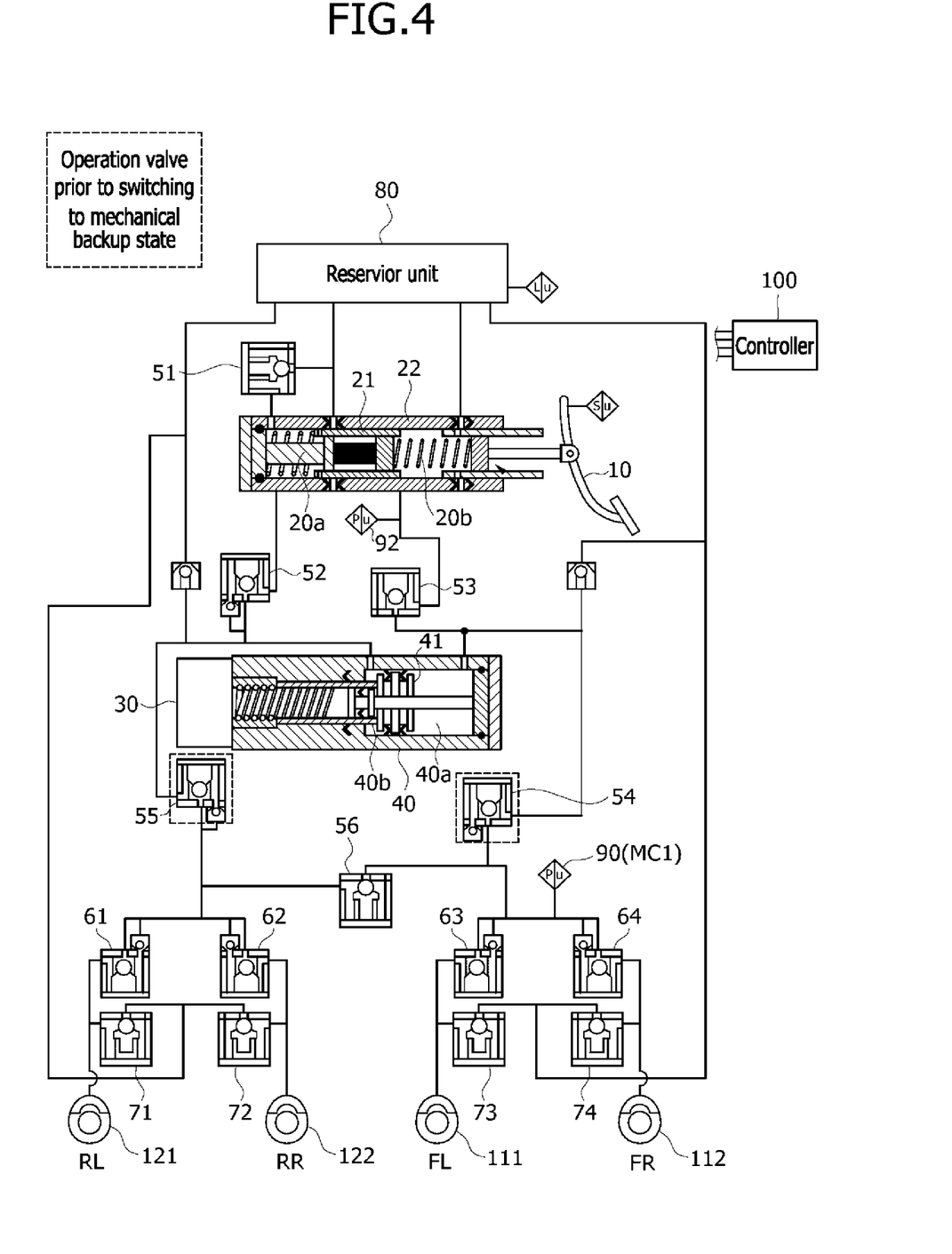
FIG. 4 is an exemplary diagram illustrating operation valves prior to switching to a mechanical backup state in FIG. 2.

For example, if the master cylinder unit 40 and the actuator (i.e., motor) 30 are in the normal state, as illustrated in FIG. 3, the generation of the required braking force is detected by the pedal stroke sensor S/u. Accordingly, in the state in which the first, third, fifth and sixth oil pressure relief valves 51, 53, 55, and 56 are operating, the controller 100 forward operates the piston of the master cylinder unit 40 by driving the actuator (i.e., motor) 30, thereby forming pressure.

If pressure (i.e., braking pressure) according to the pressure control cannot be formed (No in S106), this means that a failure has occurred in the master cylinder unit 40 and the actuator (i.e., motor) 30 during braking. In this case, the controller 100 checks whether a plurality of pre-designated oil pressure relief valves (i.e., the fourth and fifth oil pressure relief valves 54 and 55) are in the normal state (S107).

If, as a result of the check in S107, the plurality of pre-designated oil pressure relief valves (i.e., the fourth and fifth oil pressure relief valves 54 and 55) are not in the normal state (No in S107), this means the state in which a kickback prevention operation according to the present embodiment cannot be performed. Accordingly, the controller 100 immediately switches the state of the pre-designated oil pressure relief valves to the mechanical backup state and turns on the warning lamp (S111).

In contrast, if, as a result of the check in S107, the plurality of pre-designated oil pressure relief valves (i.e., the fourth and fifth oil pressure relief valves 54 and 55) are in the normal state (Yes in S107), the controller 100 controls (i.e., performs duty control in a closed state) the plurality of pre-designated oil pressure relief valves (i.e., the fourth and fifth oil pressure relief valves 54 and 55) (S108). Furthermore, the controller 100 controls the sixth oil pressure relief valve 56 (or split block valve) (i.e., switches the state of the sixth oil pressure relief valve 56 to the closed state) (S109).

For reference, the fourth and fifth oil pressure relief valves 54 and 55 are oil pressure relief valves that couple the master cylinder unit 40 and the flow channels of a circuit and are normally open (NO) valves. That is, the NO valve is a valve which is in the open state at normal times during which control (i.e., duty control) is not performed, and switches to the closed state through control (i.e., duty control). In contrast, each of the first and sixth oil pressure relief valves 51 and 56 is a valve which is in the closed state at normal times during which control (i.e., duty control) is not performed, and switches to the open state upon control (i.e., duty control).

For example, when a failure in which braking pressure cannot be formed by the master cylinder unit 40 occurs (Yes in S107) in the state in which the fourth and fifth oil pressure relief valves 54 and 55 are normal, the controller 100 turns on the warning lamp and cuts off output of the actuator (i.e., motor) 30 of the master cylinder unit 40, and at the same time, closes the fourth and fifth oil pressure relief valves 54 and 55 through control (i.e., duty control) in accordance with a pressure order value from a driver or pressure formed in the pedal cylinder 20, and does not operate the remaining oil pressure relief valves.

Furthermore, when pressure (i.e., PC1 pressure) of the pedal cylinder unit 20 detected by the pedal cylinder pressure sensor 92 (PC1) is smaller than pressure (i.e., MC1 pressure) of a circuit (i.e., the flow channels of the valves 61 to 64 and 71 to 74 for forming braking pressure in the wheel cylinders 111, 112, 121, and 122) detected by the first pressure sensor 90 (MC1) (Yes in 5110) in the state in which the pedal stroke continues to be input (i.e., pedal stroke>0), the controller 100 continues to perform control (i.e., duty control in the closed state) over the plurality of pre-designated oil pressure relief valves (i.e., the fourth and fifth oil pressure relief valves 54 and 55) and control (i.e., control in the closed state) over the sixth oil pressure relief valve 56 (or split block valve) (S107 to S110).

At this time, when the driver additionally steps on the brake pedal and the pressure becomes a state PC1>=MC1, the controller 100 controls the fourth and fifth oil pressure relief valves 54 and 55 (e.g., applies the duty as 0, that is, controls the fourth and fifth oil pressure relief valves 54 and 55 to be in the open state) so that pressure formed in the pedal simulator 21 is delivered to the circuit side. Accordingly, braking corresponding to the required braking force input by the driver through the brake pedal may be performed.

Furthermore, as described above, the controller 100 performs control (i.e., gradually performs duty control in the open state) over the fourth and fifth oil pressure relief valves 54 and 55 in accordance with the driver pressure order value (i.e., the required braking force) even in the failure state of the actuator (i.e., motor) 30 of the master cylinder unit 40. Accordingly, if the driver slowly releases the brake pedal, a kickback phenomenon does not occur because pressure of the circuit is also gradually reduced based on the driver's intention of braking.

That is, the control (i.e., duty control) over the plurality of pre-designated oil pressure relief valves (i.e., the fourth and fifth oil pressure relief valves 54 and 55) and the continuous control over the sixth oil pressure relief valve 56 (or split block valve) (S107 to S110) mean that the driver does not step on the brake pedal (i.e., the required braking force does not occur) or the pressure (i.e., PC1 pressure) of the pedal cylinder unit 20 detected by the pedal cylinder pressure sensor 92 (PC1) is equal to or greater than the pressure (i.e., MC1 pressure) of the circuit (i.e., the flow channels of the valves 61 to 64 and 71 to 74 for forming braking pressure in the wheel cylinders 111, 112, 121, and 122) detected by the first pressure sensor 90 (MC1).

Accordingly, when the driver does not step on the brake pedal (i.e., the required braking force does not occur) or the pressure (i.e., PC1 pressure) of the pedal cylinder unit 20 detected by the pedal cylinder pressure sensor 92 (PC1) is equal to or greater than the pressure (i.e., MC1 pressure) of the circuit (i.e., the flow channels of the valves 61 to 64 and 71 to 74 for forming braking pressure in the wheel cylinders 111, 112, 121, and 122) detected by the first pressure sensor 90 (MC1) (No in S110), the controller 100 switches the state of the valves to the mechanical backup state and turns on the warning lamp (S111).

As described above, according to the present embodiment, when a failure in which braking pressure cannot be controlled in the master cylinder unit 40 occurs while the ESC integrated braking system performs braking in the normal state, the ESC integrated braking system does not immediately switch to the mechanical backup state, but controls the fourth and fifth oil pressure relief valves 54 and 55 until a driver releases the brake pedal or pressure of the pedal simulator 21 and pressure on the circuit side become equal to each other. Accordingly, the present embodiment has an effect in that it can prevent the occurrence of a kickback phenomenon.

According to an aspect of the present disclosure, when a failure in which pressure cannot be formed by the actuator occurs in the master cylinder unit, the ESC integrated braking system switches to the mechanical backup state in which a braking force is generated by only the pedal force of a driver. Accordingly, it is possible to prevent a kickback phenomenon occurring because a liquid measure formed in the master cylinder unit flows into the pedal simulator and thus sudden pressure is formed in the pedal simulator.

The present disclosure has been described above with reference to the embodiments illustrated in the accompanying drawings, but the embodiments are merely illustrative. A person having ordinary skill in the art to which the present disclosure pertains will understand that various modifications and other equivalent embodiments are possible from the embodiments. Accordingly, the technical range of protection of the present disclosure should be determined by the following claims. Furthermore, an implementation described in this specification may be realized as a method or process, apparatus, software program, data stream or signal, for example. Although the present disclosure has been discussed only in the context of a single form of an implementation (e.g., discussed as only a method), the discussed characteristic may also be implemented in another form (e.g., apparatus or program). The apparatus may be implemented as proper hardware, software or firmware. The method may be implemented in an apparatus, such as a processor commonly referring to a processing device, including a computer, a microprocessor, an integrated circuit or a programmable logic device, for example. The processor includes a communication device, such as a computer, a cell phone, a mobile phone/personal digital assistant ("PDA") and another device which facilitates the communication of information between end-users.

What is claimed is:

1. A method of controlling an electronic stability control (ESC) integrated braking system, the method comprising:
   when a failure in which pressure is unable to be formed in a master cylinder unit is detected during braking of a vehicle by the ESC integrated braking system, maintaining, by a controller, a braking force applied during the braking by closing designated oil pressure relief valves for coupling the master cylinder unit and a flow channel of a circuit; and
   when pressure (PC1) of a pedal cylinder unit becomes equal to or greater than pressure (MC1) of the circuit based on the maintained braking force, by a brake pedal stepped on by a driver, controlling, by the controller, the designated oil pressure relief valves to be in an open state and then switching the state of the designated oil pressure relief valves to a mechanical backup state.

2. The method of claim 1, wherein the circuit is a flow channel comprising inlets valve and outlet valves for forming braking pressure in respective wheel cylinders of front wheels and rear wheels via the designated oil pressure relief valves.

3. The method of claim 1, further comprising immediately switching, by the controller, the state of the designated oil pressure relief valves to the mechanical backup state when the failure in which pressure is unable to be formed in the master cylinder unit is detected prior to the braking of the vehicle by the ESC integrated braking system.

4. The method of claim 3, further comprising:
   when a failure in which pressure is unable to be formed in the master cylinder unit is not detected prior to the braking of the vehicle by the ESC integrated braking system,
   checking, by the controller, whether a required braking force is generated through a pedal stroke sensor; and
   determining, by the controller, that the required braking force has not been generated if a pedal stroke is 0 as a result of the check and performing initial location control for maintaining the master cylinder unit in an initial state.

5. The method of claim 4, further comprising:
   if, the pedal stroke is not 0 as a result of the check,
   calculating, by the controller, required pressure corresponding to the pedal stroke value; and
   performing, by the controller, pressure control over the master cylinder unit in accordance with the calculated required pressure by driving an actuator of the master cylinder unit.

6. The method of claim 5, further comprising:
   if pressure of the master cylinder unit corresponding to the pressure control is unable to be formed after the performing of the pressure control over the master cylinder unit in accordance with the calculated required pressure, checking, by the controller, whether the designated oil pressure relief valves are in a normal state; and immediately switching, by the controller, the state of the designated oil pressure relief valves to the mechanical backup state if the designated oil pressure relief valves are not in the normal state as a result of the check of the states of the designated oil pressure relief valves.

7. The method of claim 1, wherein the designated oil pressure relief valves comprise:

a fourth oil pressure relief valve for coupling the master cylinder unit and a flow channel of a front wheel-side circuit, and a fifth oil pressure relief valve for coupling the master cylinder unit and a flow channel of a rear wheel-side circuit.

8. The method of claim 6, further comprising:

if the designated oil pressure relief valves are in the normal state, performing, by the controller, duty control over the designated oil pressure relief valves in a closed state; and controlling, by the controller, a sixth oil pressure relief valve to be in the closed state, the sixth oil pressure relief valve being a split block valve formed in a flow channel for coupling the designated oil pressure relief valves.

9. The method of claim 1, further comprising:

in the maintaining of the braking force applied during the braking by closing the designated oil pressure relief valves for coupling the master cylinder unit and the flow channel of the circuit, in a state in which a pedal stroke continues to be input, controlling to continue to maintain, by the controller, the designated oil pressure relief valves in the closed state when the pressure of the pedal cylinder unit is smaller than the pressure of the circuit.

10. The method of claim 1, further comprising:

after the maintaining of the braking force applied during the braking by closing the designated oil pressure relief valves for coupling the master cylinder unit and the flow channel of the circuit, when the brake pedal is released, performing, by the controller, duty control over the designated oil pressure relief valves in the open state in accordance with a released degree of the brake pedal.

11. The method of claim 1, wherein in the maintaining of the braking force applied during the braking by closing the designated oil pressure relief valves for coupling the master cylinder unit and the flow channel of the circuit, the controller releases the maintaining of the braking force when a required braking force does not occur because the driver does not step on the brake pedal or the pressure of the pedal cylinder unit is equal to or greater than the pressure of the circuit.

12. The method of claim 11, wherein when the maintaining of the braking force is released, the controller switches the state of the designated oil pressure relief valves to the mechanical backup state and turns on a warning lamp.

13. An electronic stability control (ESC) integrated braking system, the system comprising:

a master cylinder unit;
oil pressure relief valves;
a pedal cylinder unit; and
a controller, wherein, when a failure in which pressure is unable to be formed in the master cylinder unit is detected during braking of a vehicle by the ESC integrated braking system, the controller maintains a braking force applied during the braking by closing designated oil pressure relief valves for coupling the master cylinder unit and a flow channel of a circuit, and wherein, when pressure (PC1) of the pedal cylinder unit becomes equal to or greater than pressure (MC1) of the circuit based on the maintained braking force, by a brake pedal stepped on by a driver, the controller controls the designated oil pressure relief valves to be in an open state and then switches the state of the designated oil pressure relief valves to a mechanical backup state.

14. The system of claim 13, wherein the circuit is a flow channel comprising inlets valve and outlet valves for forming braking pressure in respective wheel cylinders of front wheels and rear wheels via the designated oil pressure relief valves.

15. The system of claim 13, wherein the controller immediately switches the state of the designated oil pressure relief valves to the mechanical backup state when the failure in which pressure is unable to be formed in the master cylinder unit is detected prior to the braking of the vehicle by the ESC integrated braking system.

16. The system of claim 15, wherein, when a failure in which pressure is unable to be formed in the master cylinder unit is not detected prior to the braking of the vehicle by the ESC integrated braking system, the controller checks whether a required braking force is generated through a pedal stroke sensor, and determines that the required braking force has not been generated if a pedal stroke is 0 as a result of the check and performs initial location control for maintaining the master cylinder unit in an initial state.

17. The system of claim 16, wherein, if the pedal stroke is not 0 as a result of the check, the controller calculates required pressure corresponding to the pedal stroke value, and performs pressure control over the master cylinder unit in accordance with the calculated required pressure by driving an actuator of the master cylinder unit.

18. The system of claim 13, wherein, in a state in which a pedal stroke continues to be input, the controller controls to continue to maintain the designated oil pressure relief valves in the closed state when the pressure of the pedal cylinder unit is smaller than the pressure of the circuit.

19. The system of claim 13, wherein, after maintaining the braking force applied during the braking by closing the designated oil pressure relief valves for coupling the master cylinder unit and the flow channel of the circuit, when the brake pedal is released, the controller performs duty control over the designated oil pressure relief valves in the open state in accordance with a released degree of the brake pedal.

20. The system of claim 13, wherein when maintaining the braking force applied during the braking by closing the designated oil pressure relief valves for coupling the master cylinder unit and the flow channel of the circuit, the controller releases the maintaining of the braking force when a required braking force does not occur because the driver does not step on the brake pedal or the pressure of the pedal cylinder unit is equal to or greater than the pressure of the circuit.

* * * * *